United States Patent
Anantaram et al.

(10) Patent No.: US 10,679,009 B2
(45) Date of Patent: Jun. 9, 2020

(54) SYSTEM AND METHOD FOR BELIEF BASED HUMAN-BOT CONVERSATION

(71) Applicant: Tata Consultancy Services Limited, Mumbai (IN)

(72) Inventors: Chandrasekhar Anantaram, Gurganon (IN); Amit Sangroya, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/958,731

(22) Filed: Apr. 20, 2018

(65) Prior Publication Data

US 2018/0307678 A1 Oct. 25, 2018

(30) Foreign Application Priority Data

Apr. 21, 2017 (IN) .............................. 201721014239

(51) Int. Cl.
| | | |
|---|---|---|
| *G06F 17/27* | (2006.01) | |
| *G10L 15/22* | (2006.01) | |
| *G06N 3/04* | (2006.01) | |
| *G06N 3/08* | (2006.01) | |
| *G06F 40/30* | (2020.01) | |
| *G06F 40/205* | (2020.01) | |

(52) U.S. Cl.
CPC ............ *G06F 40/30* (2020.01); *G06F 40/205* (2020.01); *G06N 3/0445* (2013.01); *G06N 3/08* (2013.01); *G10L 15/22* (2013.01)

(58) Field of Classification Search
None
See application file for complete search history.

(56) References Cited

U.S. PATENT DOCUMENTS

| | | | | |
|---|---|---|---|---|
| 8,335,754 | B2 * | 12/2012 | Dawson | G06F 17/2705 706/45 |
| 8,600,747 | B2 | 12/2013 | Abella et al. | |
| 9,792,560 | B2 * | 10/2017 | Jeong | G06F 16/951 |
| 9,911,413 | B1 * | 3/2018 | Kumar | G10L 15/1815 |
| 10,114,815 | B2 * | 10/2018 | Bostick | G06F 17/2785 |

(Continued)

OTHER PUBLICATIONS

Gizem Sogancioglu et al. "Dialog Management for Credit Card Selling via Finite State Machine Using Sentiment Classification in Turkish Language" Jul. 23, 2017 to Jul. 27, 2017, pp. 38 to 43 Publisher: IARIA, 2017 Link: https://www.thinkmind.org/download.php?articleid=intelli_2017_2_30_60066.

(Continued)

*Primary Examiner* — Jonathan C Kim
(74) *Attorney, Agent, or Firm* — Finnegan, Henderson, Farabow, Garrett & Dunner LLP

(57) ABSTRACT

A chat bot is a system designed to engage in a conversation with users on various tasks, like resolving a complaint, especially over internet. The present disclosure computes a set of hidden intent of a user from by using a set of words and a domain ontology associated with the set of words. Initially, the input sentence is analyzed to identify a category associated with it. Further, the set of words are extracted from the categorized input sentence using sentence parsers. Further, the set of hidden intent of the user is utilized for computing a set of epistemic rules. Further, the set of epistemic rules are utilized to compute a set of hop states and a next sentence is generated based on the set of hop states.

9 Claims, 4 Drawing Sheets

(56) References Cited

U.S. PATENT DOCUMENTS

| | | | |
|---|---|---|---|
| 2012/0053945 | A1 | 3/2012 | Gupta et al. |
| 2015/0179168 | A1* | 6/2015 | Hakkani-Tur .......... G10L 15/22 704/257 |
| 2015/0227845 | A1* | 8/2015 | Hakkani-Tur ...... G06F 17/2785 706/52 |
| 2015/0228275 | A1 | 8/2015 | Watanabe et al. |
| 2015/0347480 | A1* | 12/2015 | Smart ................. G06F 16/2264 707/743 |
| 2016/0063993 | A1* | 3/2016 | Dolan .................... G10L 15/08 704/254 |
| 2016/0162456 | A1* | 6/2016 | Munro ................. G06F 3/0482 704/9 |
| 2017/0243120 | A1* | 8/2017 | Doan ................. G06F 17/2785 |
| 2017/0372200 | A1* | 12/2017 | Chen ........................ G06N 3/08 |
| 2018/0060301 | A1* | 3/2018 | Li ........................ G06F 17/2775 |
| 2018/0218252 | A1* | 8/2018 | Wu ........................ G06N 3/006 |

OTHER PUBLICATIONS

Alexander Blom et al. "A sentiment-based chatbot" Date: 2013, Publisher: KTH Computer Science and Communication,Link: http://www.csc.kth.se/utbildning/kth/kurser/DD143X/dkand13/Group8Anna/report/TwitterBot_AlexanderSofie.pdf.

Anusha Vegesna et al. Ontology based Chatbot (For E-commerce Website) International Journal of Computer Applications ,Date: Jan. 2018, Volume-issue number(s): vol. 179—No. 14,Publisher: International Journal of Computer Applications in Technology Link: https://www.ijcaonline.org/archives/volume179/number14/vegesna-2018-ijca-916215.pdf.

Amit Sangroya et al. "Automatic Extraction of Domain Specific Latent Beliefs in Customer Complaints to help tailor Chatbots" Title of the item: AAAI 2018 Workshop Date: Feb. 2018;Volume-issue number(s):Publisher: Zensar Technologies Ltd Link: https://www.zensar.com/deep-dial18.

Jason D. Williams et al. "Scaling POMDPs for dialog management with composite summary point-based value iteration (CSPBVI)" Statistical and Empirical Approaches for Spoken Dialogue Systems, Date: May 9, 2006;Publisher: 2006 AAAI Workshop Link: http://www.aaai.org/Library/Workshops/2006/ws06-14-007.php.

Esther Levin et al. "A stochastic model of computer-human interaction for learning dialogue strategies" Eurospeech; Date: 1997,Publisher: Eurospeech Link: http://www.thepieraccinis.com/publications/1997/Eurospeech_97_MDP.pdf.

* cited by examiner

SYSTEM AND METHOD FOR BELIEF BASED HUMAN-BOT CONVERSATION

PRIORITY CLAIM

This U.S. patent application claims priority under 35 U.S.C. § 119 to: India Application No. 201721014239, filed on Apr. 21, 2017. The entire contents of the aforementioned application are incorporated herein by reference.

TECHNICAL FIELD

The embodiments herein generally relates, in general, to automated conversational system and, in particular, to a system and method for belief based human-bot conversation.

BACKGROUND

A chat bot is a system designed to engage in a conversation with users on various tasks, such as to resolve a complaint, especially over internet. In recent years, users are expecting fast response from organizations regarding the complaint. Generally, the complaint description is a set of complex natural language sentences describing a problem faced by the users. Additionally, the problem descriptions includes background information, superfluous information and emotions of the users embedded in it. Traditional complaint processing systems like phone line, instant messaging, e-mail and web based interface results in longer wait times and unreliable services to the users. In order to reduce the wait time and to increase the reliability in service, traditional complaint processing systems like help desks are replaced with chat bots.

In conventional methods, the chat bots are trained with extremely large dialog corpus to cover a number of scenarios or having a complex set of hand crafted rules to address certain specific scenarios. Since the complaint description by the users may include complex natural language sentences, historical descriptions of a problem and emotions, the conventional methods are not able to cope up with the real-time complex situations. Additionally, conventional chat bots are domain based, and unable to handle dialogue based on the emotions of the user.

SUMMARY

Embodiments of the present disclosure present technological improvements as solutions to one or more of the above-mentioned technical problems recognized by the inventors in conventional systems. For example, in one embodiment, a method for belief based human-bot conversation is provided. The method includes receiving, an input sentence from a user, wherein the input sentence is a complex natural language sentence, by the one or more hardware processors. Further, the method includes analyzing, the input sentence by utilizing a pre-trained sequence modelling based Recurrent Neural Network (RNN) to obtain a category associated with the input sentence, by the one or more hardware processors. Furthermore, the method includes parsing, the input sentence based on the category to obtain a set of words associated with the input sentence by utilizing a dependency parser, wherein the set of words are extracted based on dependencies among a noun and a verb associated with the input sentence, by the one or more hardware processors. Furthermore, the method includes computing, a set of hidden intent of the user by analyzing the set of words and a set of domain ontology associated with the set of words, by the one or more hardware processors. Furthermore, the method includes computing, a set of epistemic rules based on the set of hidden intent of the user and the set of words by utilizing a pre-trained Machine Learning (ML) technique, by the one or more hardware processors. Furthermore, the method includes computing, a set of hop states based on the set of epistemic rules, by the one or more hardware processors. Furthermore, the method includes generating, a next sentence based on the set of hop states, by the one or more hardware processors.

In another aspect, a system for belief based human-bot conversation is provided. The system includes one or more memories comprising programmed instructions and a repository for storing a plurality of input sentences, a plurality of belief knowledge and a set of domain ontology, one or more hardware processors operatively coupled to the one or more memories, wherein the one or more hardware processors are capable of executing the programmed instructions stored in the one or more memories, and a chat bot analysis unit, wherein the chat bot analysis unit is configured to receive, an input sentence from a user, wherein the input sentence is a complex natural language sentence. Further, the chat bot analysis unit is configured to analyze, the input sentence by utilizing a pre-trained sequence modelling based Recurrent Neural Network (RNN) to obtain a category associated with the input sentence. Furthermore the chat bot analysis unit is configured to parse, the input sentence based on the category to obtain a set of words associated with the input sentence by utilizing a dependency parser, wherein the set of words are extracted based on dependencies among a noun and a verb associated with the input sentence. Furthermore, the chat bot analysis unit is configured to compute a set of hidden intent of the user by analyzing the set of words and a set of domain ontology associated with the set of words. Furthermore, the chat bot analysis unit is configured to compute a set of epistemic rules based on the set of hidden intent of the user and the set of words by utilizing a pre-trained Machine Learning (ML) technique Furthermore, the chat bot analysis unit is configured to compute, a set of hop states based on the set of epistemic rules. Finally, the signal analysis unit is configured to generate, a next sentence based on the set of hop states.

In yet another aspect, a computer program product comprising a non-transitory computer-readable medium having embodied therein a computer program for system and method for belief based human-bot conversation, is provided. The computer readable program, when executed on a computing device, causes the computing device to receive, receive, an input sentence from a user, wherein the input sentence is a complex natural language sentence. Further, the computer readable program, when executed on a computing device, causes the computing device to analyze, the input sentence by utilizing a pre-trained sequence modelling based Recurrent Neural Network (RNN) to obtain a category associated with the input sentence. Furthermore, the computer readable program, when executed on a computing device, causes the computing device to parse, the input sentence based on the category to obtain a set of words associated with the input sentence by utilizing a dependency parser, wherein the set of words are extracted based on dependencies among a noun and a verb associated with the input sentence. Furthermore, the computer readable program, when executed on a computing device, causes the computing device to compute, a set of hidden intent of the user by analyzing the set of words and a set of domain ontology associated with the set of words. Furthermore, the computer readable program, when executed on a computing device, causes the computing device to compute, a set of epistemic rules based on the set of hidden intent of the user and the set of words by utilizing a pre-trained Machine Learning (ML) technique. Furthermore, the computer readable program, when executed on a computing device, causes the computing device to compute, a set of hop states based on the set of epistemic rules. Furthermore, the computer readable program, when executed on a computing device, causes the computing device to generate, a next sentence based on the set of hop states.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
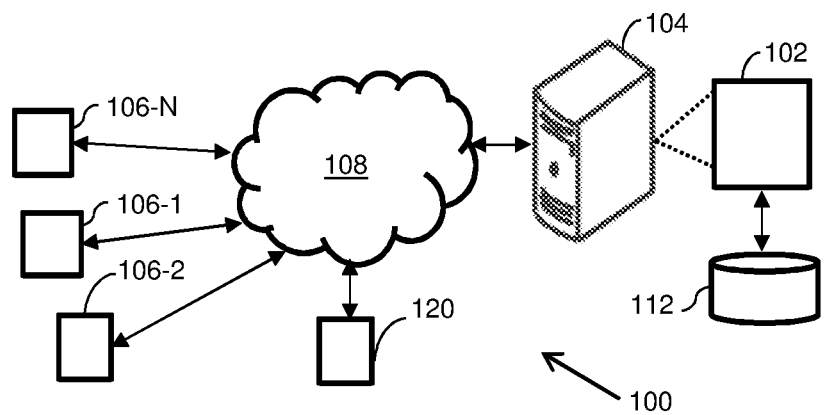
FIG. 1 illustrates a network environment implementing a system and method for belief based human-bot conversation, according to some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter overcomes the limitations of the conventional chat bots by computing a set of hidden intent of a user from by using a set of words extracted from an input sentence and a domain ontology associated with the set of words. Further, the set of hidden intent of the user is utilized for computing a set of epistemic rules. Further, the set of epistemic rules are utilized to compute a set of hop states and a next sentence is generated based on the set of hop states. An implementation of the system and method for belief based human-bot conversation is described further in detail with reference to FIGS. 1 through 4.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 illustrates a network environment 100 implementing a system 102 for belief based human-bot conversation, according to an example embodiment of the present subject matter. The system for belief based human-bot conversation 102, hereinafter referred to as the system 102, is configured for receiving an input sentence by using an input device 120, wherein the input sentence can be a complex natural language sentence. The system 102 may be embodied in a computing device, for instance a computing device 104.

Although the present disclosure is explained considering that the system 102 is implemented on a server, it may be understood that the system 102 may also be implemented in a variety of computing systems, such as a laptop computer, a desktop computer, a notebook, a workstation, a cloud-based computing environment and the like. In one implementation, the system 102 may be implemented in a cloud-based environment. It will be understood that the system 102 may be accessed by multiple users through one or more user devices 106-1, 106-2 . . . 106-N, collectively referred to as user devices 106 hereinafter, or applications residing on the user devices 106. Examples of the user devices 106 may include, but are not limited to, a portable computer, a personal digital assistant, a handheld device, a Smartphone, a Tablet Computer, a workstation and the like. The user devices 106 are communicatively coupled to the system 102 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112. The components and functionalities of the system 102 are described further in detail with reference to FIG. 2.

Figure 2:
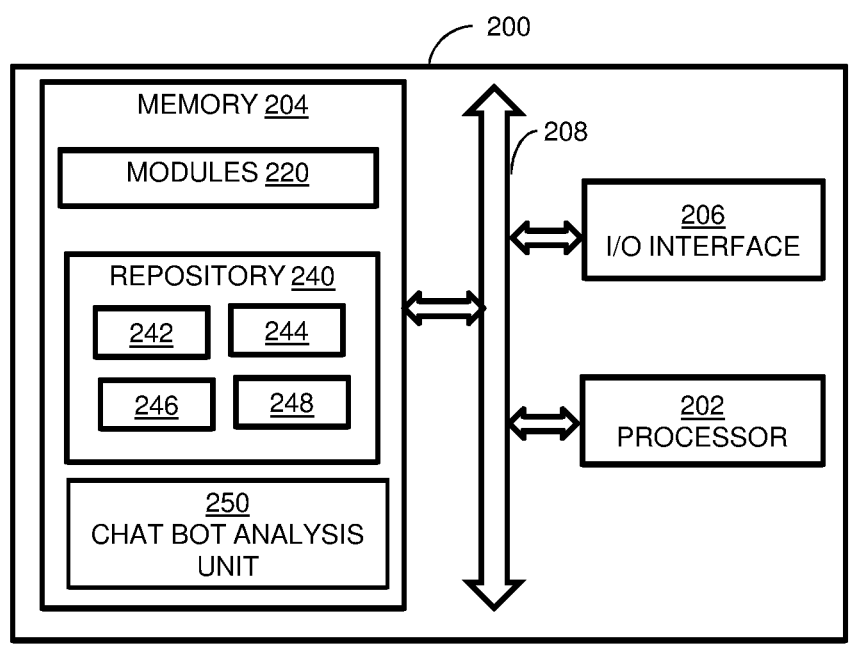
FIG. 2 illustrates a block diagram of the system for belief based human-bot conversation, according to some embodiments of the present disclosure.

FIG. 2 illustrates a block diagram of the system for belief based human-bot conversation, according to some embodiments of the present disclosure. The belief based human-bot conversation system 200 (hereinafter referred to as system 200) may be an example of the system 102 of FIG. 1. In an example embodiment, the system 200 may be embodied in, or is in direct communication with the system, for example the system 102 (FIG. 1). The system 200 includes or is otherwise in communication with one or more hardware processors such as a processor 202, at least one memory such as a memory 204, an I/O interface 206 and a chat bot analysis unit 250. In an embodiment, the chat bot analysis unit 250 can be implemented as a module in the memory 204 comprising a sentence analysis module (not shown in FIG. 2), a sentence parsing module (not shown in FIG. 2), a hidden intent computation module (not shown in FIG. 2), epistemic rule construction module (not shown in FIG. 2) and a next sentence generation module (not shown in FIG. 2). The processor 202, memory 204, and the I/O interface 206 may be coupled by a system bus such as a system bus 208 or a similar mechanism.

The I/O interface 206 may include a variety of software and hardware interfaces, for example, a web interface, a graphical user interface, and the like. The interfaces 206 may include a variety of software and hardware interfaces, for example, interfaces for peripheral device(s), such as a keyboard, a mouse, an external memory, a camera device, and a printer. Further, the interfaces 206 may enable the system 102 to communicate with other devices, such as web servers and external databases. The interfaces 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 206 may include one or more ports for connecting a number of computing systems with one another or to another server computer. The I/O interface 206 may include one or more ports for connecting a number of devices to one another or to another server.

The hardware processor 202 may be implemented as one or more microprocessors, microcomputers, microcontrollers, digital signal processors, central processing units, state machines, logic circuitries, and/or any devices that manipulate signals based on operational instructions. Among other capabilities, the hardware processor 202 is configured to fetch and execute computer-readable instructions stored in the memory 204.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 204 includes a plurality of modules 220 and a repository 240 for storing data processed, received, and generated by one or more of the modules 220 and the image analysis unit 250. The modules 220 may include routines, programs, objects, components, data structures, and so on, which perform particular tasks or implement particular abstract data types.

The memory 204 also includes module(s) 220 and a data repository 240. The module(s) 220 include programs or coded instructions that supplement applications or functions performed by the belief based human-bot conversation system 200. The modules 220, amongst other things, can include routines, programs, objects, components, and data structures, which perform particular tasks or implement particular abstract data types. The modules 220 may also be used as, signal processor(s), state machine(s), logic circuitries, and/or any other device or component that manipulates signals based on operational instructions. Further, the modules 220 can be used by hardware, by computer-readable instructions executed by a processing unit, or by a combination thereof. The modules 220 can include various sub-modules (not shown). The modules 220 may include computer-readable instructions that supplement applications or functions performed by the belief based human-bot conversation system 200.

The data repository 240 may include received input sentences 242, a belief knowledgebase 244, an epistemic rule database 246 and other data 248. Further, the other data 248 amongst other things, may serve as a repository for storing data that is processed, received, or generated as a result of the execution of one or more modules in the module(s) 220 and the modules associated with the chat bot analysis unit 250.

Although the data repository 240 is shown internal to the belief based human-bot conversation system 200, it will be noted that, in alternate embodiments, the data repository 240 can also be implemented external to the belief based human-bot conversation system 200, where the data repository 240 may be stored within a database (not shown in FIG. 2) communicatively coupled to the belief based human-bot conversation system 200. The data contained within such external database may be periodically updated. For example, new data may be added into the database (not shown in FIG. 2) and/or existing data may be modified and/or non-useful data may be deleted from the database (not shown in FIG. 2). In one example, the data may be stored in an external system, such as a Lightweight Directory Access Protocol (LDAP) directory and a Relational Database Management System (RDBMS). In another embodiment, the data stored in the data repository 240 may be distributed between the belief based human-bot conversation system 200 and the external database.

Figure 3A:
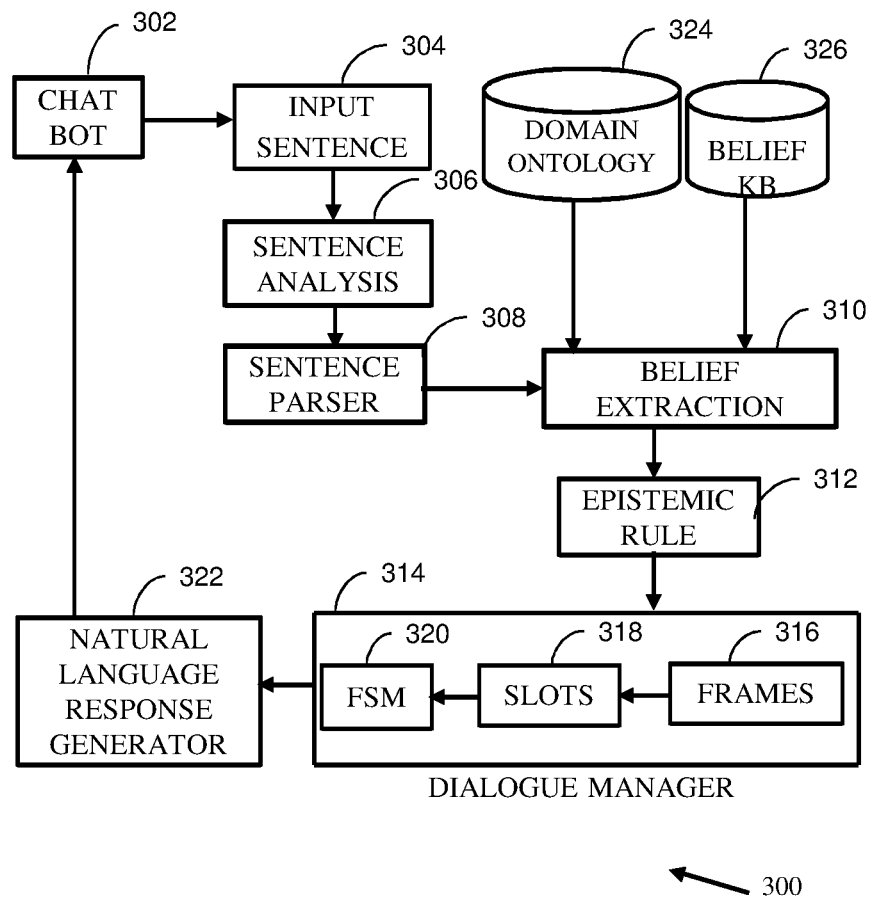
FIG. 3A illustrates an example system architecture for belief based human-bot conversation, according to some embodiments of the present disclosure.

FIG. 3A illustrates an example system architecture for belief based human-bot conversation 300, according to some embodiments of the present disclosure. The architecture 300 includes a chat bot 302, a sentence receiving unit 304 to receive an input sentence, a sentence analysis unit 306 to categorize the input sentence into a predefined category, a sentence parser unit 308 to parse the input sentence and extract a set of words from the input sentence, a belief extraction unit 310 to extract the set of hidden intent from the user based on the set of words and a domain ontology associated with the set of words, an epistemic rule calculation unit 312 to calculate a set of epistemic rules based on the set of hidden intent of the user, a dialogue manager 314 to calculate a number of hop states based on the set of epistemic rules and to skip the states in Finite State Machine (FSM) based on the number of hop states, a Natural Language (NL) response generator 322 to generate natural language from a machine representation, a domain ontology database 324 to store a plurality of domain ontologies and a belief knowledgebase 326 to store a plurality of sentences and the corresponding beliefs. In an embodiment, the belief extraction unit 310 calculates the set of hidden intent of the user by analysing the set of words and a set of domain ontology 324 associated with the set of words. In an embodiment, the epistemic rule calculation unit 312 computes the set of epistemic rules based on the set of hidden intent of the user and the set of words by utilizing a pre-trained Machine Learning (ML) technique. In an embodiment, the sentence analysis unit 306 categorizes the input sentence into a predefined category based on a pre-trained sequence modelling based Recurrent Neural Network (RNN). The RNN is used to categorize the input sentence to obtain a category associated with the input sentence. In an embodiment, the sentence parser unit 308 parses the input sentence based on the category to obtain the set of words associated with the input sentence by utilizing a dependency parser, wherein the set of words are extracted based on dependencies among a noun and a verb associated with the input sentence. The dialog manager 316 includes a Finite State Machine (FSM) that uses a plurality of frames 316 and the plurality of frames are filled with the information extracted from the input sentence. In an embodiment, the information extracted from the input sentence can be the set of words. The plurality of frames 316 consists of a plurality of slots 318 with information (the set of words) extracted from the input sentence. Moreover, the plurality of frames 316 provides a contextual input relevant for the FSM. The FSM performs the conversation between the user and the bot based on the number of hop states (transition). For the brevity of description, the chat bot can be alternatively referred to as bot.

The chat bot analysis unit 250 of the belief based human-bot conversation system 200 can be configured to receive, an input sentence from the user, wherein the input sentence is a complex natural language sentence. The complex natural language sentence may include prior history of conversation and hidden emotion of the user.

Further, the chat bot analysis unit 250 of the belief based human-bot conversation system 200 can be further configured to analyze, the input sentence by utilizing a pre-trained sequence modelling based Recurrent Neural Network (RNN) to obtain a category associated with the input sentence. The sequence modelling based RNN can have variable length input and variable length output. Initially, the sequence modelling based RNN is trained by utilizing a set of labelled data, wherein the set of labelled data includes a set of sentences and a category associated with each sentence. Further, the input sentence is categorized into the category by utilizing the pre-trained sequence modelling based RNN. In an embodiment, the input sentence can be a complaint made by a car owner. For example, in a car-complaints domain, the sequence modelling based RNN is used to classify the user complaints into six categories including Transmission Problems, Gear Problems, Windows-Windshield Problems, Engine failure Problems, Wheels-Hubs Problems and AC-Heater Problems. For example, the user complaint: "Slowly the noise from my wheel bearings grew and grew and is now unbearable" belongs to the category of wheel problems. In parallel to categorization of the input sentence, a preprocessing is performed on the input sentence. In an embodiment, the preprocessing refers to text classification. The text classification is performed initially to obtain vocabulary from the input sentence. The text processing includes converting all characters associated with the input sentence into lower case, removing common names, removing stop words, removing numbers and removing Uniform Resource Locators (URLs). The vocabulary obtained from the text classification includes all words present in the input sentence.

Further, the chat bot analysis unit 250 of the belief based human-bot conversation system 200 can be configured to parse, the input sentence based on the category to obtain a set of words associated with the input sentence by utilizing the dependency parser, wherein the set of words are extracted based on dependencies among the noun and the verb associated with the input sentence. The dependency parser can be one of a plurality of conventional parsers including Stanford-Core Natural Language Processor (NLP), GATE (General Architecture for Text Engineering), and MITIE (Massachusetts Institute of Technology Information Extraction). The dependency parsers parses the input sentence and extract a set of keywords. In an embodiment, the set of keywords can be triples obtained from the input sentence after parsing. For example, a plurality of triples are extracted from the parsed car complaint description by focusing on dependencies among nouns and verbs. For example, for a complaint description "my car just died on me", the extracted triples includes "my-car", "just-died-on" and "me". Further, a set of facts are asserted based on the set of words (the set of triples) based on the set of words. For example, a fact asserted from the triplet "(my-car, just-died-on, me)" can be "car (not-running)".

Further the chat bot analysis unit 250 of the belief based human-bot conversation system 200 can be configured to compute, the set of hidden intent of the user by analyzing the set of words and a set of domain ontology associated with the set of words by:

(i) Evaluating, a set of opinions from the set of words by utilizing an opinion mining technique, wherein the set of opinion includes a positive opinion and a negative opinion. Each opinion from the set of opinions is associated with an opinion weight. The opinion weight can be a positive opinion weight or a negative opinion weight, wherein the opinion weight associated with each opinion is updated based on domain ontology associated with the category of the user complaint. For example, a higher weight is assigned to a complaint belonging to critical category. Further, the weight is updated based on a set of knowledge from the domain ontology and based on the category associated with the input sentence. In an embodiment, considering, the car complaint scenario, "engine failure" is considered as a critical category of complaint and the "engine failure" complaint is assigned a higher weight when compared to a complaint "body paint".

Figure 3B:
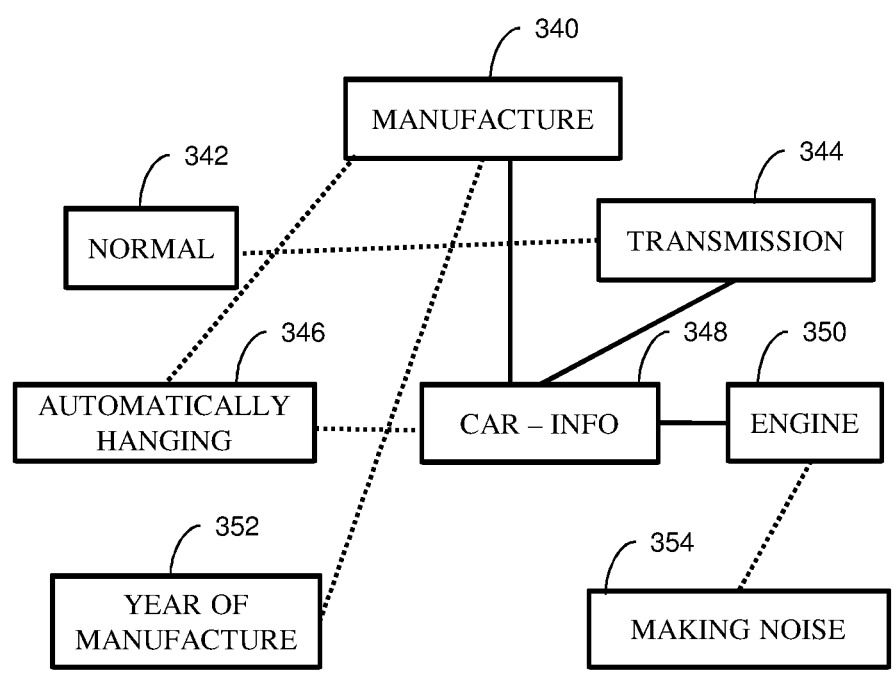
FIG. 3B illustrates an example ontology knowledge graph associated with a car complaint domain, according to some embodiments of the present disclosure.

(ii) Evaluating, a set of contextual information from the set of words by utilizing the opinion mining technique, wherein the set of contextual information is associated with the domain ontology of the input sentence. An ontology includes a large knowledge graph providing the set of contextual information associated with the domain. For example, the knowledge graph includes the set of words and the relationship among the set of words in a particular context. The set of words are represented as nodes of the knowledge graph. FIG. 3B illustrates an example ontology knowledge graph associated with the car complaint domain, according to some embodiments of the present disclosure. Referring now to FIG. 3B, a set of parts associated with a specific domain are connected by solid lines and a set of characteristics among the set of parts are connected with dotted lines. For example, in an automobile domain (refer FIG. 3B), a set of automobile parts are terms like engine 350, manufacture 340 and transmission 344 are connected with solid lines. The set of characteristics associated with the set of automobile parts like "normal" 342, "automatically hanging" 346, "year of manufacture" 352 and "making noise" 354 are relationships and represented by dotted lines. Here, engine can be considered as a term and dead, active, noisy can be considered a relationship. Further, an automated nearest neighbor approach is applied on the knowledge graph to identify the severity associated with the input sentence. For example, each node is classified as sensitive node or non-sensitive node. The nodes closer to sensitive nodes are also considered as sensitive nodes and a positive opinion weight is updated. The non-sensitive nodes are assigned a negative opinion weight and (iii) Computing the set of hidden intent associated with the user by applying the set of domain ontology to the set of opinions and the set of information by utilizing a pre-trained LSTM, wherein the pre-trained LSTM is trained with a set of input sentences appeared in the past and the corresponding responses. For brevity of description, the hidden intent of the user can be alternatively referred to as "latent belief" or "belief" of the user. For example, in the car-complaints domain, considering the initial user complaint, "Drove vehicle out of town. While on highway vehicle engine just quit. Made an emergency stop because car lost power. While on side of the road vehicle would not start! Vehicle was towed in.", the probable asserted beliefs includes "Belief 1) Car was working before. Belief 2) Engine not working now. Belief 3) cannot use car". In another example, for a description "my car just died on me", the belief asserted is "car (not-running)".

Further the chat bot analysis unit 250 of the belief based human-bot conversation system 200 can be configured to compute, a set of epistemic rules based on the set of hidden intent of the user and the set of words by utilizing a pre-trained Machine Learning (ML) technique. The set of epistemic rules make assertions about the states in the FSM, the states to be skipped and the states to be evaluated in order to be consistent with the beliefs of the user. For example in the car complaints domain, a plurality of rules like "Rule 1) Belief (Car was working before) and category (Complete Engine Failure)=>Knows-Agent (Car does not start now), Knows-Agent (Engine does not crank), Knows-Agent (Engine is dead)" asserts belief about the current epistemic state of the user.

Further, the chat bot analysis unit 250 of the belief based human-bot conversation system 200 can be configured to compute, a set of hop states based on the set of epistemic rules. For example in the car complaints domain, the actions on the FSM are: "Action 1) Skip car starting FSM states, Action 2) Skip engine cranking FSM states, Action 3) Enquire when the engine stopped working, Action 4) Enquire noise and other signs that occurred when the car stopped working, Action 5) Enquire on the state of the battery, Action 6) Enquire when the servicing was done last". This makes the dialog more relevant for the user and satisfies the corresponding belief of the user.

Further, the chat bot analysis unit 250 of the belief based human-bot conversation system 200 can be configured to generate, a next sentence based on the set of hop states. Here, based on the set of hop states in the FSM, the chat bot asks relevant questions to the user. The user may respond using a "yes/no" type or a set of new sentences.

Figure 4:
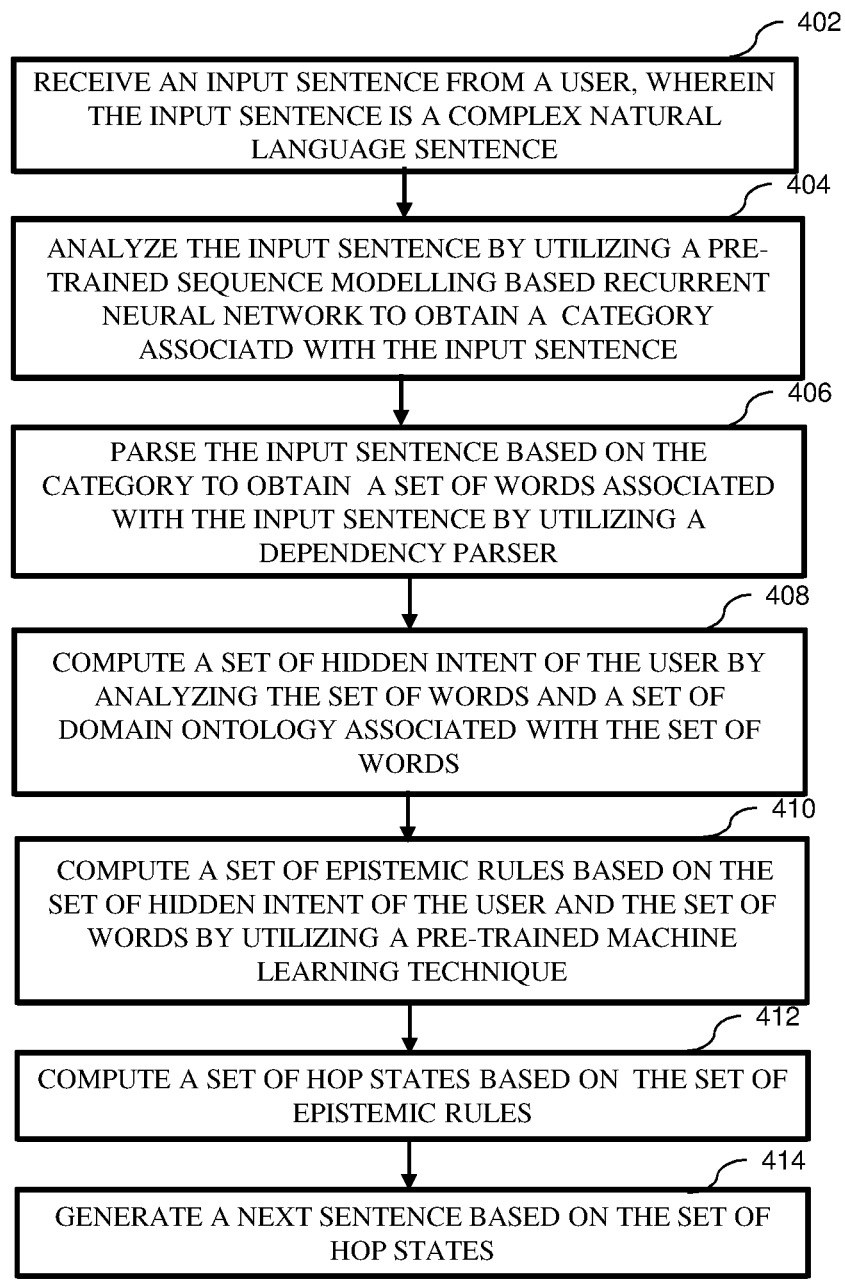
FIG. 4 illustrates an example flow diagram for belief based human-bot conversation, according to some embodiments of the present disclosure.

FIG. 4 illustrates a flow diagram of a method 400 for the belief based human-bot conversation, according to some embodiments of the present disclosure. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communication network. The order in which the method 400 is described is not intended to be construed as a limitation, and any number of the described method blocks can be combined in any order to implement the method 400, or an alternative method. Furthermore, the method 400 can be implemented in any suitable hardware, software, firmware, or combination thereof.

At step 402, the method 400 enables the system 200 to receive, by the one or more hardware processors, the input sentence from a user, wherein the input sentence is a complex natural language sentence. At step 404, the method 400 enables the system 200 to analyze, by the one or more hardware processors, the input sentence by utilizing a pre-trained sequence modelling based Recurrent Neural Network (RNN) to obtain a category associated with the input sentence. Analyzing the input sentence by utilizing the pre-trained sequence modelling based Recurrent Neural Network (RNN) to obtain the category associated with the input sentence further includes (i) training the sequence modelling based RNN by utilizing a set of labelled data, wherein the set of labelled data comprising a set of sentences and a category associated with each sentence and (ii) categorizing the input sentence into the category by utilizing the pre-trained sequence modelling based RNN. At step 406, the method 400 enables the system 200 to parse the input sentence based on the category, by the one or more hardware processors, to obtain a set of words associated with the input sentence by utilizing a dependency parser, wherein the set of words are extracted based on dependencies among a noun and a verb associated with the input sentence. At step 408, the method 400 enables the system 200 to compute, by the one or more hardware processors, a set of hidden intent of the user by analyzing the set of words and a set of domain ontology associated with the set of words. The set of hidden intent of the user by analyzing the set of words and the set of domain ontology associated with the set of words further includes: (i) evaluating, a set of opinions from the set of words by utilizing an opinion mining technique, wherein the set of opinion includes a positive opinion and a negative opinion. Each opinion from the set of opinions is associated with an opinion weight, wherein the opinion weight associated with each opinion is updated based on domain ontology associated with the category of the user complaint. (ii) evaluating, a set of contextual information from the set of words by utilizing the opinion mining technique, wherein the set of contextual information is associated with the domain ontology the input sentence and (iii) the set of hidden intent associated with the user by applying the set of domain ontology to the set of opinions and the set of information by utilizing a pre-trained LSTM, wherein the pre-trained LSTM is trained with a set of input sentences appeared in the past and the corresponding responses. At step 410, the method 400 enables the system 200 to compute, by the one or more hardware processors, a set of epistemic rules based on the set of hidden intent of the user and the set of words by utilizing a pre-trained Machine Learning (ML) technique. At step 412, the method 400 enables the system 200 to compute, by the one or more hardware processors, the set of hop states based on the set of epistemic rules. At step 414, the method 400 enables the system 200 to generate, by the one or more hardware processors, a next sentence based on the set of hop states.

In an example embodiment, the system 200 is tested with publicly available car complaint database. Here, a plurality of complaints categories are taken into consideration and the complaint analysis (input sentence analysis) module has been implemented in Theano. The Theano is a python library to define, optimize and evaluate mathematical expressions including multi-dimensional arrays in an efficient manner. Moreover, the system 200 is trained in Graphics Processing Unit (GPU) of the computing system in order to improve efficiency of parallel computing. As an example, in one of our experiments, the total size of a data set used for testing was 61,252, the size of validation and test set was 6,125 and the size of the training set was 49,002.

In an example embodiment, the present disclosure is implemented in the sequence modelling based RNN model including Word2Vec (CBOW) embedding with a word dimension of 100 and hidden units dimension of 50. As an example, in one of our experiments, the test accuracy of complaint categorization with Vanilla LSTM (Long Short Term Memory) was 68.47%. The beliefs and epistemic rules helped to tailor the dialog to the expectation of the user.

In an example embodiment, the dialogue between the human chat bot and the user when the user complains a problem in the car is as illustrated in Table 1.

TABLE 1

| | |
|---|---|
| User | My car is making noise. |
| Human Chat Bot | Can you tell me if it is engine noise or noise from the body? |
| User | I think it is the engine. |
| Human Chat Bot | What is the kind of engine noise it is making? |
| User | Heavy |
| Human Chat Bot | When did you do the last maintenance service? |
| User | About six months ago. |
| Human Chat Bot | Okay. Can you tell me that during ignition what kind of noise does the engine make? |
| User | Normal sound |
| Human Chat Bot | Oh okay. Well then it is most probably worn engine bearings. You need to replace the bearings. |

In an example embodiment, the tailoring of the dialogue between the human chat bot and the user when the user complains a problem in the car is as illustrated in Table 2A, 2B, 2C, 2D, 2E and 2F. Here, two complaints are considered and the complaints includes Complaint 1 and Complaint 2.

Complaint 1: My car just died on me. No warning no check engine. Car just out of extended warranty all maintenance up to date. Had issues with charcoal canister, and shift lever. Called user support a week ago and talked to a Mr. Joe McDonald. I tried his number and it is no longer in service. I just retired and 6K repair is something I cannot afford. I've owned many cars but this has been the worst. Door handles replaced, suspension, etc. Horrible Car Engine croaked without overheating, no warning, no check engine.

Complaint 2: I had my transmission replaced with a used one 2 years ago for $1500 (bad idea), only for it to go out again last month and the repair is gonna cost me $1900 that I do not have. So, I am now without a vehicle again. I've talked to so many others and they too have the same problem, which is transmission slipping (specifically 3rd gear). There are far too many identical problems for this to not be recalled.

The table 2A illustrates the user complaints and the corresponding extracted triples. The table 2B illustrates the user complaints and the corresponding facts asserted. The table 2C illustrates the user complaints and the corresponding Belief Rules. The table 2D illustrates the user and the corresponding believes derived. The table 2E illustrates the user complaints and the corresponding epistemic rules. The table 2F illustrates the user complaints and the corresponding actions on FSM.

TABLE 2A

| User Complaints | Extracted Triples |
|---|---|
| Complaint 1 | Triple 1) (my-car, just-died-on, me) |
| | Triple 2) (had-issues, with, charcoal canister) |
| | Triple 3) (had-issues, with, shift-lever) |
| | Triple 4) (engine, croaked, without overheating) |
| | Triple 5) (engine, croaked, no warning) |
| | Triple 6) (engine, croaked, no check engine) |
| | Triple 7) (car, just-out-of, extended warranty) |
| | Triple 8) (car, all maintenance, up-to-date) |
| Complaint 2 | Triple 1) (I, had, my transmission replaced) |
| | Triple 2) (I, replaced, with a used one two years ago) |
| | Triple 3) (it, go out again, last month) |
| | Triple 4) (I, now, without a vehicle) |
| | Triple 5) (I, have talked to, so many others) |
| | Triple 6) (problem, transmission, slipping) |

TABLE 2B

| User Complaints | Facts Asserted |
|---|---|
| Complaint 1 | Fact 1) car(not-running) |
| | Fact 2) encountered-problem(charcoal-canister) |
| | Fact 3) encountered-problem(shift-lever) |
| | Fact 4) engine(dead) |
| | Fact 5) overheating(no) |
| | Fact 6) warning-lights(no) |
| | Fact 7) check-engine-light(no) |
| | Fact 8) extended-warranty(over) |
| | Fact 9) scheduled-maintenance(done) |
| Complaint 2 | Fact 1) transmission(replaced) |
| | Fact 2) encountered-problem(transmission) |
| | Fact 3) car(not-running) |
| | Fact 4) encountered-problem(transmission-slipping) |

TABLE 2C

| User Complaints | Belief Rules |
|---|---|
| Complaint 1 | Belief Rule 1 (not-running) and scheduled-maintenance(done) then assert-belief (car-was running-before), assert-belief (car-not-running-now), assert-belief (basic car-care, done) Belief Rule 2) If overheating(no) and warning-lights(no) and check engine-light(no) then assert-belief (engine-failure, sudden) |
| Complaint 2 | Belief Rule 1) If car (not-running) And encountered-problem( transmission) then assert-belief (engine(working)), Assert-belief( power(not-reaching-wheels)) Belief Rule 2) If Encountered-problem (Transmission-slipping) then assert-belief(car(can-move)) |

TABLE 2D

| User Complaints | Beliefs Derived |
|---|---|
| Complaint 1 | Belief 1) car-was-running-before(yes) |
| | Belief 2) car-not-running-now(yes) |
| | Belief 3) engine-failure(sudden) |
| | Belief 4) basic-car-care(done) |
| Complaint 2 | Belief 1) engine(working) |
| | Belief 2) power(not-reaching-wheels) |
| | Belief 3) car(can-move) |

TABLE 2E

| User Complaints | Epistemic Rules |
|---|---|
| Complaint 1 | Epistemic Rule 1)<br>If belief(car-was-running-before) and belief(car-not-running-now) and belief(basic-car-care(done)) then Knows-Agent (Car does not move), Knows-Agent(Engine does not-crank), Knows-Agent (Engine is dead)<br>Epistemic Rule 2)<br>Belief(Engine failure (sudden)) then knows-Agent (Cannot drive car now), Knows-Agent (Major Fault) |
| Complaint 2 | Epistemic Rule 1)<br>If belief(engine(working)) and belief(car(can-move)) then Knows-Agent (Engine can start)<br>Epistemic Rule 2)<br>If Belief (power(not-reaching-wheels)) then Knows-Agent (Cannot drive car now), Knows-Agent(Major Fault) |

TABLE 2F

| User Complaints | Actions on FSM |
|---|---|
| Complaint 1 | Action 1) Skip car starting FSM states<br>Action 2) Skip engine cranking FSM states<br>Action 3) Enquire when the engine stopped working<br>Action 4) Enquire about noise and other signs that occurred when the car stopped working<br>Action 5) Enquire about the state of the battery<br>Action 6) Enquire when the servicing was done last |
| Complaint 2 | Action 1) Skip engine cranking FSM states<br>Action 2) Enquire when the transmission problem started<br>Action 3) Enquire about maintenance history<br>Action 4) Skip car driving experience questions |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed methods and system for belief based human-bot conversation are able to provide a user's hidden intent based human bot conversation in an efficient manner. Further, in the present disclosure the, input sentences are classified but not limited, using RNN based neural network. The categorized input sentences are sent as input to the belief knowledge base and the epistemic rule engine rather than sending all the input sentences to the rule engine for increasing performance. Moreover the present disclosure is generic and can be applied easily in any other domains such as complaints about hardware and or software issues etc. The number of epistemic rules in the system 200 can be increased. Moreover, the system 200 can be implemented in the GPUs, thus increasing the parallelism. Additionally, the human-bot is configured to skip some FSM states based on the epistemic rules thus increasing the efficiency of the system 200.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for belief based human-bot conversation, the method comprising:
   receiving, by one or more hardware processors, a plurality of input sentences from a user, wherein the plurality of input sentences is a complex natural language sentence;
   analyzing, by the one or more hardware processors, the plurality of input sentences by utilizing a pre-trained sequence modelling based Recurrent Neural Network (RNN) to obtain a category associated with each of the plurality of input sentences;
   parsing, by the one or more hardware processors, the plurality of input sentences based on the category to obtain a set of words associated with the plurality of input sentences by utilizing a dependency parser, wherein the set of words comprises a plurality of triples, and wherein each of the plurality of triples is extracted based on dependencies among a noun and a verb associated with the corresponding input sentence;
   computing, by the one or more hardware processors, a set of hidden intent of the user by analyzing the plurality of triples and a set of domain ontology associated with the plurality of triples by:
      evaluating a set of opinions from each of the plurality of triples by an opinion mining technique, wherein the set of opinions comprises a positive opinion and a negative opinion, wherein each opinion from the set of opinions is associated with an opinion weight, and wherein a higher opinion weight is assigned to a user complaint belonging to a critical category;
   computing, by the one or more hardware processors, a set of epistemic rules based on the set of hidden intent of the user and the plurality of triples by utilizing a pre-trained Machine Learning (ML) technique;
   computing, by the one or more hardware processors, a set of hop states based on the set of epistemic rules; and
   generating, by the one or more hardware processors, a next sentence based on the set of hop states, wherein the set of hop states provides a number of states to be skipped to generate the next sentence.

2. The method of claim 1, wherein computing the set of hidden intent of the user by analyzing the plurality of triples and the set of domain ontology associated with the plurality of triples comprises:
   evaluating a set of contextual information from the plurality of triples by the opinion mining technique, wherein the set of contextual information is associated with the domain ontology of the corresponding input sentence; and
   computing the set of hidden intent associated with the user by applying the set of domain ontology to the set of opinions and the set of contextual information by utilizing a pre-trained Long Short-Term Memory (LSTM), wherein the pre-trained LSTM is trained with a set of input sentences that appeared in the past and corresponding responses.

3. The method of claim 1, wherein each rule from the set of epistemic rules is related to knowledge of the input sentence.

4. The method of claim 1, wherein analyzing the input sentence by utilizing the pre-trained sequence modelling based Recurrent Neural Network (RNN) to obtain the category associated with the input sentence comprises:
   training the sequence modelling based RNN by utilizing a set of labelled data, the set of labelled data comprising a set of sentences and a category associated with each sentence; and
   analyzing the input sentence into the category by utilizing the pre-trained sequence modelling based RNN.

5. A system for belief based human-bot conversation, the system comprising:
   one or more memories comprising programmed instructions and a repository for storing a plurality of input sentences, a plurality of belief knowledge and a set of domain ontology;
   one or more hardware processors operatively coupled to the one or more memories, wherein the one or more hardware processors are configured to execute the programmed instructions stored in the one or more memories to:
      receive a plurality of input sentences from a user, wherein the plurality of input sentences is a complex natural language sentence;
      analyze the plurality of input sentences by utilizing a pre-trained sequence modelling based Recurrent Neural Network (RNN) to obtain a category associated with each of the plurality of input sentences;
      parse the plurality of input sentences based on the category to obtain a set of words associated with the plurality of input sentences by utilizing a dependency parser, wherein the set of words comprises a plurality of triples, and wherein each of the plurality of triples is extracted based on dependencies among a noun and a verb associated with the corresponding input sentence;
      compute a set of hidden intent of the user by analyzing the plurality of triples and a set of domain ontology associated with the plurality of triples by:
         evaluating a set of opinions from each of the plurality of triples by an opinion mining technique, wherein the set of opinions comprises a positive opinion and a negative opinion, wherein each opinion from the set of opinions is associated with an opinion weight, and wherein a higher opinion weight is assigned to a user complaint belonging to a critical category;
      compute a set of epistemic rules based on the set of hidden intent of the user and the plurality of triples by utilizing a pre-trained Machine Learning (ML) technique;
      compute a set of hop states based on the set of epistemic rules; and
      generate a next sentence based on the set of hop states, wherein the set of hop states provides a number of states to be skipped to generate the next sentence.

6. The system of claim 5, wherein computing the set of hidden intent of the user by analyzing the plurality of triples and the set of domain ontology associated with the plurality of triples comprises:
   evaluating a set of contextual information from the plurality of triples by utilizing the opinion mining technique, wherein the set of contextual information is associated with the domain ontology of the corresponding input sentence; and
   computing the set of hidden intent associated with the user by applying the set of domain ontology to the set of opinions and the set of contextual information by utilizing a pre-trained LSTM, wherein the pre-trained LSTM is trained with a set of input sentences appeared in the past and corresponding responses.

7. The system of claim 5, wherein each rule from the set of epistemic rules is related to knowledge of the input sentence.

8. The system of claim 5, wherein analyzing the input sentence by utilizing the pre-trained sequence modelling based Recurrent Neural Network (RNN) to obtain the category associated with the input sentence comprises:
training the sequence modelling based RNN by utilizing a set of labelled data, the set of labelled data comprising a set of sentences and a category associated with each sentence; and
analyzing the input sentence into the category by utilizing the pre-trained sequence modelling based RNN.

9. One or more non-transitory machine readable information storage media storing instructions which when executed by one or more hardware processors cause the one or more hardware processors to perform a method comprising:
receiving, by the one or more hardware processors, a plurality of input sentences from a user, wherein the plurality of input sentences is a complex natural language sentence;
analyzing, by the one or more hardware processors, the input sentence by utilizing a pre-trained sequence modelling based Recurrent Neural Network (RNN) to obtain a category associated with each of the plurality of input sentences;
parsing, by the one or more hardware processors, the plurality of input sentences based on the category to obtain a set of words associated with the plurality of input sentences by utilizing a dependency parser, wherein the set of words comprises a plurality of triples, and wherein each of the plurality of triples is extracted based on dependencies among a noun and a verb associated with the corresponding input sentence;
computing, by the one or more hardware processors, a set of hidden intent of the user by analyzing the plurality of triples and a set of domain ontology associated with the plurality of triples by:
evaluating a set of opinions from each of the plurality of triples by an opinion mining technique, wherein the set of opinions comprises a positive opinion and a negative opinion, wherein each opinion from the set of opinions is associated with an opinion weight, and wherein a higher opinion weight is assigned to a user complaint belonging to a critical category;
computing, by the one or more hardware processors, a set of epistemic rules based on the set of hidden intent of the user and the plurality of triples by utilizing a pre-trained Machine Learning (ML) technique;
computing, by the one or more hardware processors, a set of hop states based on the set of epistemic rules; and
generating, by the one or more hardware processors, a next sentence based on the set of hop states, wherein the set of hop states provides a number of states to be skipped to generate the next sentence.

\* \* \* \* \*